US009027510B2

(12) United States Patent
Fujiyoshi

(10) Patent No.: US 9,027,510 B2
(45) Date of Patent: May 12, 2015

(54) MULTI-LEVEL AQUACULTURE DEVICE FOR BENTHIC ORGANISMS SUCH AS BIVALVES, AQUACULTURE METHOD, AND BIOFILTER USING SAME

(76) Inventor: Yoshihiro Fujiyoshi, Kamiamakusa (JP)

( * ) Notice: Subject to any disclaimer, the term of this patent is extended or adjusted under 35 U.S.C. 154(b) by 88 days.

(21) Appl. No.: 13/983,922

(22) PCT Filed: Feb. 8, 2012

(86) PCT No.: PCT/JP2012/052827
§ 371 (c)(1),
(2), (4) Date: Aug. 29, 2013

(87) PCT Pub. No.: WO2012/108456
PCT Pub. Date: Aug. 16, 2012

(65) Prior Publication Data
US 2014/0041596 A1    Feb. 13, 2014

(30) Foreign Application Priority Data
Feb. 9, 2011    (JP) ................................. 2011-026460

(51) Int. Cl.
*A01K 61/00*    (2006.01)

(52) U.S. Cl.
CPC .................................... *A01K 61/002* (2013.01)

(58) Field of Classification Search
USPC .......... 119/236, 238, 239, 240, 207, 209, 241
See application file for complete search history.

(56) References Cited

U.S. PATENT DOCUMENTS

| | | | | |
|---|---|---|---|---|
| 3,741,159 A * | 6/1973 | Halaunbrenner | ............. | 119/240 |
| 4,186,687 A * | 2/1980 | Gilpatric | ....................... | 119/241 |
| 4,257,351 A * | 3/1981 | Scura et al. | .................... | 119/234 |
| 4,559,902 A * | 12/1985 | Mason et al. | .................. | 119/209 |
| 5,097,795 A * | 3/1992 | Adey | ............................. | 119/262 |
| 5,377,624 A * | 1/1995 | Craig et al. | ..................... | 119/234 |
| 5,628,280 A * | 5/1997 | Ericsson | ......................... | 119/239 |
| 5,653,193 A * | 8/1997 | Marissal | ........................ | 119/240 |
| 6,305,323 B1 * | 10/2001 | Tsai | .............................. | 119/234 |
| 7,357,097 B2 * | 4/2008 | Drengstig et al. | ............. | 119/207 |
| 7,661,390 B2 * | 2/2010 | Mortensen | ..................... | 119/240 |
| 8,291,863 B2 * | 10/2012 | Krone et al. | .................... | 119/213 |
| 8,753,851 B2 * | 6/2014 | Stephen et al. | ............... | 435/134 |

FOREIGN PATENT DOCUMENTS

| | | |
|---|---|---|
| JP | 2002-084919 | 3/2002 |
| JP | 2003-125668 | 5/2003 |
| JP | 3493357 | 2/2004 |
| JP | 2004-113228 | 4/2004 |
| JP | 3913669 | 5/2007 |
| JP | 3979746 | 9/2007 |
| JP | 2009-273440 | 11/2009 |

* cited by examiner

*Primary Examiner* — Yvonne Abbott
(74) *Attorney, Agent, or Firm* — Jordan and Hamburg LLP

(57) ABSTRACT

An elongate rectangular cultivation box having an open top, is configured so as to allow an outer tank, which serves as a cultivating water storage part, and an inner tank, which serves as a receptacle for bivalves (benthic organisms) S that are to be cultivated, to be both combined and separated. A gap that serves as a water supply opening and a gap that serves as a space in which sediments can accumulate on the bottom of the outer tank are defined when the inner tank is accommodated in the outer tank. Water passage holes are provided in the bottom of the shellfish receptacle (inner tank) and a mesh filter such as netting is stretched across the top face of the bottom. The cultivation boxes are arranged in a vertically stacked manner, with the front portions and rear portions thereof staggered so that cultivation water W that overflows over a front ledge of a shellfish receptacle flows downward into the supply water storage part of a lower cultivation box.

8 Claims, 6 Drawing Sheets

MULTI-LEVEL AQUACULTURE DEVICE FOR BENTHIC ORGANISMS SUCH AS BIVALVES, AQUACULTURE METHOD, AND BIOFILTER USING SAME

BACKGROUND OF THE INVENTION

The present invention relates to technology for farming benthic organisms such as bivalves, and particularly relates to an apparatus used for farming benthic organisms living in an environment exposed either saltwater or freshwater tides such as *venerupis philippinarum, meretrix lusoria*, and corbiculidae, to a farming method and to a biofilter using the same.

Bivalves, of which *venerupis philippinarum, meretrix lusoria*, corbiculidae and the like are representative, are typical popular Japanese seafoods, and are sources of marine protein that can be inexpensively consumed by the general public. Today, however, loss of sand beaches, tidal flats, and the like, due to pollution of ocean waters and rivers, coastal bank reinforcement and the like, has resulted in sharp declines in reserves and catches. Currently, in order to preserve reserves and catches of bivalves, farming is underway in various regions, and in many of the farming methods, spats are artificially seeded on the sea coast and the like and then cultivated in natural environments. However, these conventional farming methods are influenced by changes in the surrounding environment, have high production costs, and cannot provide the market with a stable supply.

Meanwhile, the activities of benthic organisms such as bivalves have an impact on the environment, as they feed by filtering minute phytoplankton that floats suspended in the water and detritus, which is broken pieces of the same, with their gills. In terms of the filtration capacity thereof, *venerupis philippinarum*, which has a shell length of approximately 3 cm, filters approximately 3 liters of seawater per day, and thus contributes to purification of the ocean waters, from which materials contributing to eutrophication are removed.

Conventional shellfish farming can be divided into mariculture and land-based farming. In terms of farming apparatus in the ocean, spats are cultivated by surrounding a plate or the like, to which spats are attached, with a net and lowering this into seawater, which has the advantage of easily providing an environment that is comparatively close to natural habitat conditions (see JP-3913669-B and JP-3979746-B). However, because the selling price for bivalves is low and production costs are an issue, bivalves remain in a low position in terms of farmed seafood. In particular, costs are presently a problem in terms of achieving land-based farming, and thus this has seen almost no implementation.

For example, in JP-3493357-B, farming facilities for abalone on land are described. In these farming facilities for abalone, an abalone breeding tank is arranged in multiple levels, and the abalone breeding tank is provided with a water supply pipe that supplies seawater and an overflow pipe, while an air supply pipe and a feed supply area are also provided in the breeding tank. Furthermore, in addition to causing seawater to flow into the water supply pipe with a pump, by lowering the overflow pipe, the seawater flows to the lower level water tank, so as to promote the flow of seawater. Furthermore, air is sucked into the air supply pipe with a blower, and compressed air is sprayed out in a froth. Thus, dissolved oxygen is supplied.

SUMMARY OF THE INVENTION

However, with conventional land-based farming apparatus for shellfish, achieving a clean water-environment as one in which tide passage is good, such as is the case where shellfish live, is difficult. Specifically, because the water tended to stagnate, the quantity of dissolved oxygen in the water would decrease and removal of residual feed and excrement was difficult, so that there was a problem in that disease readily occurred. The present invention is directed to solving the problems of the conventional farming technology that could depend only on the natural environment, and an object thereof is to provide a farming apparatus and a farming method that can not only inexpensively and stably provide the market with benthic organisms, such as bivalves, but can also create a flow of fresh water, provide a water environment similar to the natural habitat, and increase the cultivation quantity per unit area, and which can promote the growth of inexpensive and high-quality bivalves without using material such as sand as farming medium.

In order to achieve the objects described above, a first characteristic of the multilevel drawer-type apparatus for farming benthic organisms such as bivalves of the present invention is that of being configured in the form of a rack wherein a plurality of box-type containers are vertically stacked, which serve as cultivation beds for benthic organisms such as bivalves, and which are supplied with cultivation water or immersed in a cultivation water area, and which can be moved between said cultivation water and the air. Furthermore, a second characteristic is that of housing and cultivating the benthic organisms in a densely packed manner in the box-type containers. Moreover, a third characteristics is that of causing the lighting environment of at least the box-form containers to range from indoor daylight conditions to blackout conditions and adjusting the light in accordance with the feeding conditions of the benthic organism being cultivated. Furthermore, a fourth characteristic is that of use as a biofilter, by making use of the filtering capacity of benthic organisms so as to separate a raw liquid containing suspended matter that has been introduced to a farming tank into clean water with low suspended matter, which will serve as recirculation water or aquaculture water, and water with a high concentration of organic pollutants, which will undergo fermentative decomposition and serve as liquid fertilizer.

In contrast with conventional coastal farming methods, which might be referred to as "one-story housing," the present apparatus can be called "a high-rise housing complex," whereby production efficiency is dramatically increased. Moreover, in order to improve production efficiency, the stacked cultivation beds are formed as boxes, which are stacked in multiple levels and configured as drawers that can be pulled out of, and pushed into, a water tank or water, which is very convenient for seeding spats, observing cultivation progress, cleaning and harvesting. Furthermore, the bivalves are placed in the box-type containers in a densely packed manner, or slits are provided in the bottom of the containers, in which the bivalves are fitted so as to be upright, whereby groundbreaking effects are achieved in so much as materials such as sand, which were considered to be necessary in the past, are no longer required, and observations of the progress of the shellfish and determinations concerning cultivating conditions can be made at a glance. That is to say, the amount of water supplied and discharged is adjusted in order to control the artificial cultivating environment, but this also facilitates regulation of amounts of pollutants and feed in the water tanks, which dramatically improves productivity. Furthermore, by installing a series of such farming apparatuses, a large-scale farming plant can be developed.

In particular, land-based farming is made possible, but this can also be used on coasts and in rivers, or in paddy fields; for example, this can be used as an ancillary facility in various industries such as by way corbiculidae farming that makes use of paddy fields, or by way of using organic sludge discarded from food industries and the like as feed so that, in addition to obtaining the shellfish as a product, this sludge is purified. Furthermore, because this apparatus can be configured as a single device or as a large scale system of thousands of devices, the range in which it can be used is great, not being limited simply to the field of aquaculture, but rather extending to the supply of raw materials for the pharmaceutical and food industries, ornamental biotope facilities, and from leisure industries such as clam digging activities to large scale production plants.

DETAILED DESCRIPTION OF THE INVENTION

Figure 1:
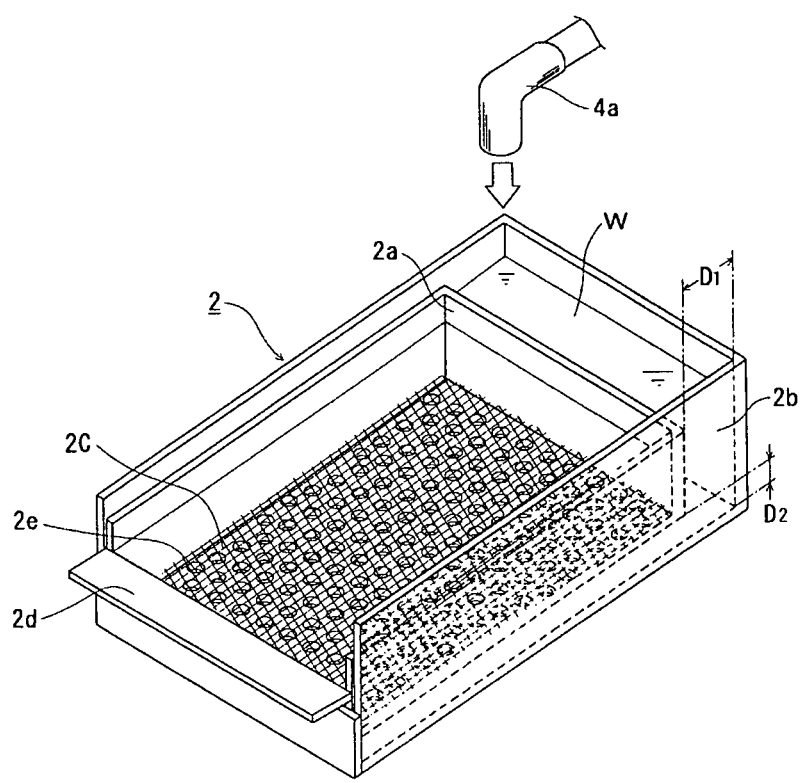
FIG. 1 is a perspective view showing one embodiment of a cultivation box according to the present invention.

Hereafter, modes of embodiment of the present invention are described on the basis of the working examples illustrated in the drawings.

Figure 2:
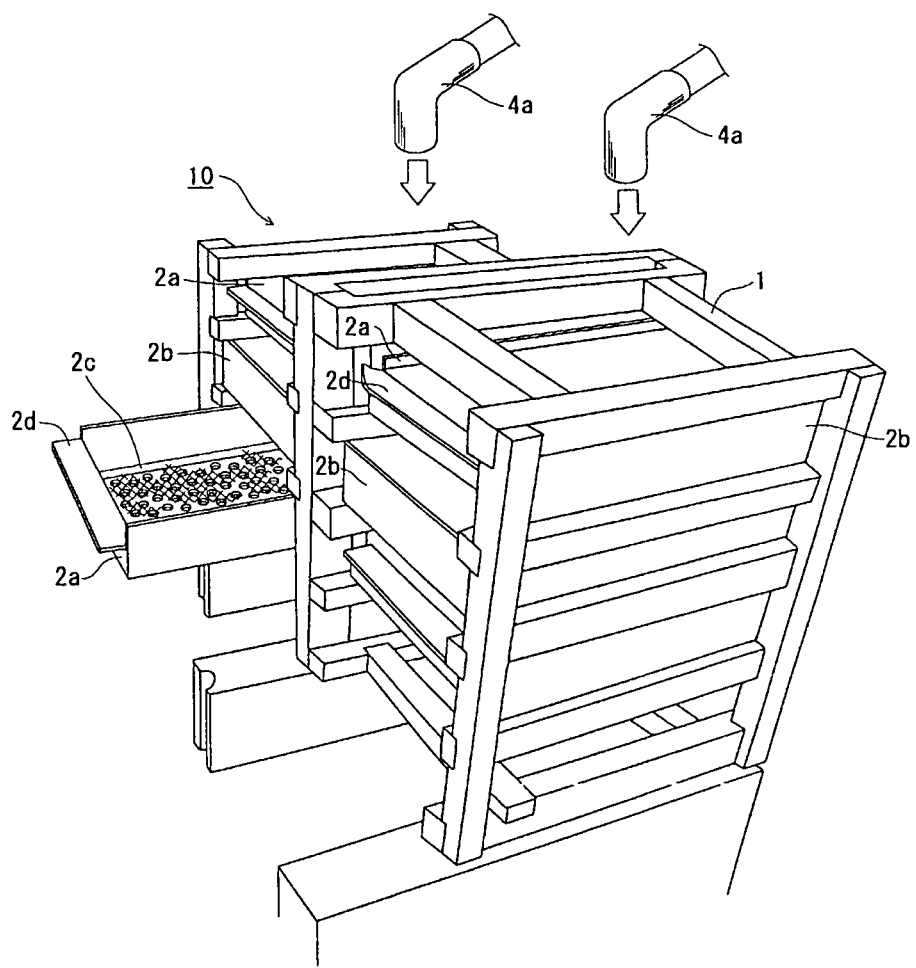
FIG. 2 is a perspective view showing the farming apparatus according to the present invention in the installed state.
Figure 3:
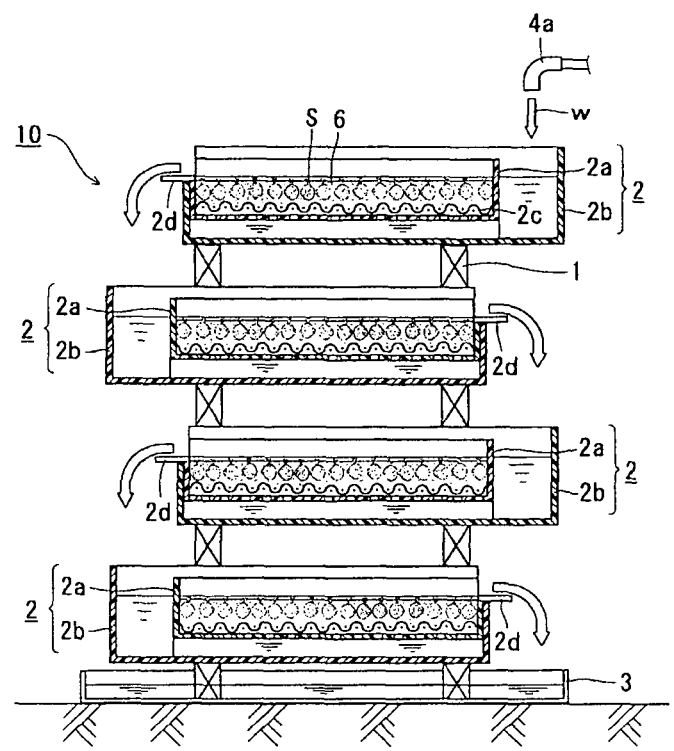
FIG. 3 is a sectional view schematically illustrating the manner in which water is supplied to the cultivation boxes.

As shown in FIG. 1 to FIG. 3, an elongate rectangular cultivation box 2 having an open top, which is used as a cultivation bed in the farming apparatus 10 according to the present invention, is configured as a box-type container in which an outer tank 2b, which serves as a cultivating water storage part, and an inner tank 2a, which serves as a receptacle for bivalves (benthic organisms) S that are to be cultivated such as *venerupis philippinarum, meretrix lusoria*, corbiculidae and oysters, can be both combined and separated. The inner tank 2a is formed so as to be shorter in the lengthwise direction than the outer tank 2b and shallower than the outer tank 2b, and is formed so that a gap $D_1$ that serves as a water supply opening for water supply from a cock 4a, and a gap $D_2$ that serves as a space in which sediments can accumulate on the bottom of the outer tank 2b are defined when the inner tank 2a is accommodated in the outer tank 2b. Furthermore, a drain cock (not illustrated) is provided on the bottom of the outer tank 2b, so that water containing high densities organic pollutants can be separated and discharged at will. In other words, the relationship between the inner tank 2a and the outer tank 2b is based on the principle of a water tank configured so as to be partitioned by a raised bottom and a divider plate.

Here, a plurality of water passage holes 2e are provided in the bottom of the shellfish receptacle (inner tank) 2a and a mesh filter such as netting 2c is stretched across the top face of the bottom. Next, the cultivation boxes 2 are arranged in a vertically stacked manner, with the front portions and rear portions thereof staggered so that cultivation water W that overflows over a front ledge 2d of a shellfish receptacle 2a flows downward into the supply or cultivating water storage part (outer tank) 2b of a lower cultivation box 2.

If a plurality of cultivation boxes 2 are stacked in multiple levels, it is preferable to use a partitioned framework stand (rack) 1 that allows for stacking without direct contact between the cultivation boxes 2, as shown in FIG. 2. The material for the rack 1 may be any of wood, synthetic resins, metals or the like, but in view of rigidity and durability, it is preferable that this be made from a material such as stainless steel, which has good corrosion resistance. Furthermore, by providing rails on the rack 1 so that the cultivation boxes 2 can be inserted and withdrawn on the rack 1 in the manner of drawers, ease of use will be dramatically improved in terms of observing the cultivated organisms and in terms of harvesting, washing and the like.

The cultivation boxes 2 according to this working example can be suitably modified depending on the location in which they are installed and the cultivation environment, and there are no restrictions on the shapes thereof, so long as this is a structure that allows the function thereof to be realized. Furthermore, as described above, the bottom of the shellfish receptacle 2a is structured so as to allow passage of the cultivation water W that is used for cultivation by way of holes or netting, but depending on the manner in which this is used, it may also be structured so that cultivation water W does not pass through the bottom plate.

Figure 4:
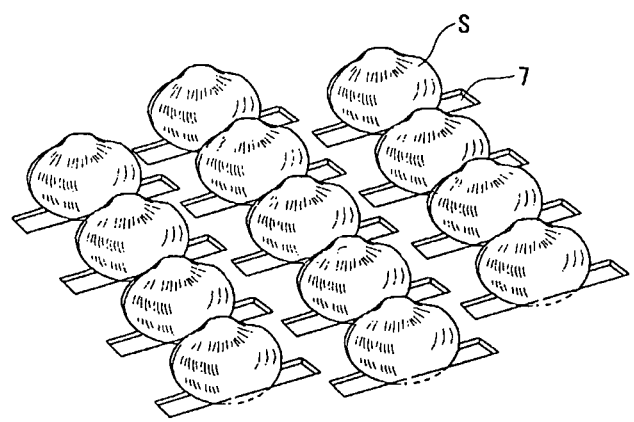
FIG. 4 is a perspective view showing bivalves upright in slits.

As shown in FIG. 2, a cultivating medium 6 such as sand, which is suited to the type of shellfish S to be cultivated, is spread in the shellfish receptacles 2a on each of the stacked levels, and the shellfish S to be cultivated, such as *venerupis philippinarum, meretrix lusoria* and corbiculidae, are placed on this culture medium 6. *Venerupis philippinarum, meretrix lusoria* and corbiculidae will bury themselves so as to produce a stable habitat. However, as a result of observation, the inventors understood that a cultivating medium 6 is not absolutely necessary. This is because it was understood that the shellfish will stand upright when fitted into simple slits 7, as shown in FIG. 4, and will stand by themselves, supporting each other in a closely packed state, which is assumed to be behavior with which the bivalves S are inherently endowed. Accordingly, with the method in which a cultivating medium 6 is not used, it is possible to harvest shellfish in a so-called de-sanded state from the beginning.

With the farming apparatus 10 according to the present invention, after assembling the cultivation boxes 2 in multiple levels, water is supplied from the top. That is to say, the cultivating area is dramatically increased with respect to the installation area of the apparatus. Note that, in order to cultivate shellfish in the farming apparatus 10, aeration must be performed by way of the flow and the falling of the cultivation water (seawater or freshwater) W, and in this regard well-known methods may be suitably selected depending on the manner in which the apparatus is used, or the aeration may be performed using a method that combines these well-known methods.

The bivalves S take-up dissolved oxygen in order to breathe, and take up suspended organic matter in the cultivation water W, which serves as food; the water aspiration and filtration-feeding makes use of the cultivation water W that is directly above the shellfish, where the inhalant siphons and the exhalant siphons are exposed at the exterior of the shell. Accordingly, an important condition for raising these bivalves S is how favorable the cultivating environment of the shellfish S is made. For example, *venerupis philippinarum* are only capable of aspirating cultivation water W in an area of a few centimeters directly thereabove. It will be appreciated that it makes no difference how good the cultivation water is, or whether feed is present, in layers above this.

In addition, feces from the cultivated shellfish and ejected organic material aggregates known as pseudofeces, which are directly ejected from their mouths, as well as sediments from the cultivation water W, accumulate in the outer tank 2b. These organic pollutants will be broken down by bacteria in the cultivation water W, but if there is insufficient oxygen in the cultivation water W, contaminants, such as hydrogen sulfide, which are toxic to living organisms, will build up as a result of anaerobic decomposition processes, and thus, in any case, the cultivated organisms will not be able to survive. In order to avoid this, it is necessary to continue to supply sufficient amounts of oxygen to both the cultivation water W and the cultivating medium 6. Furthermore, elution and washout action must be continued in order to prevent the material generated by way of decomposition by bacteria from accumulating. With this apparatus 10, a flow is continuously generated in the gap $D_2$ by the water that is supplied via the gap $D_1$ in each of the cultivating boxes 2, so that the ceiling of the gap $D_2$, which is to say the water passage holes 2e and the netting 2c at the bottom of the shellfish receptacle 2a, will also be cleaned.

Thus, the gap $D_2$ in the cultivating box 2 plays an essential role in this farming apparatus, allowing for transport of dissolved oxygen and feed. Naturally, if the cultivation water W in the cultivating box 2 is not replaced, the concentration of contaminants will increase. It is necessary to replace the cultivation water W in the cultivating box 2 in accordance with the contamination conditions, but because of the very high ratio of cultivation water W usage by the cultivated organisms S, cultivation water W replacement ratios that would be wasteful can be lowered, and consequently it suffices to replace smaller amounts of cultivation water W, which reduces costs and expenses for equipment such as pumps that supply the cultivation water W.

Figure 5:
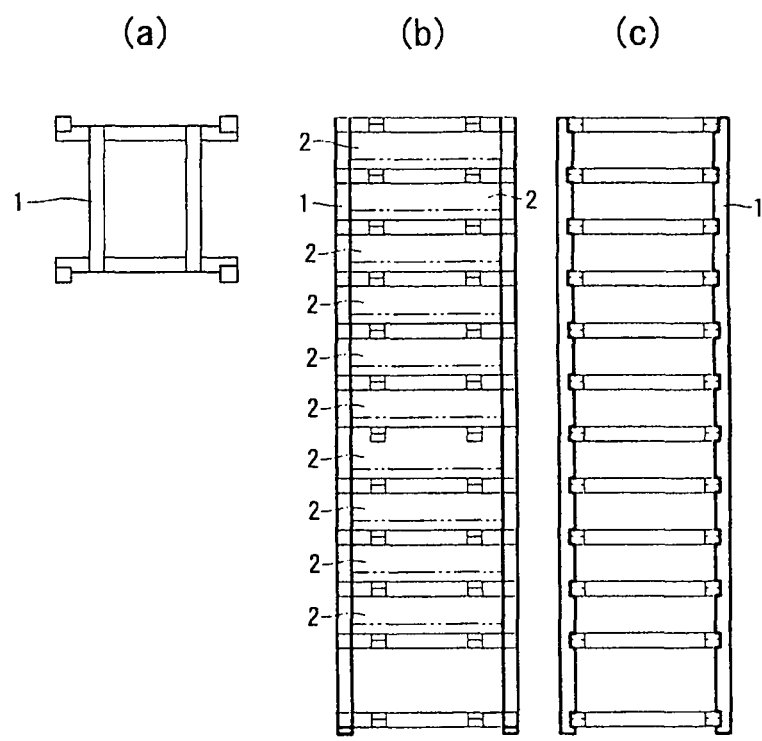
FIGS. 5(a), 5(b), 5(c) show a rack of individual units, with FIG. 5(a) being a plan view, FIG. 5(b) being a side view and FIG. 5(c) being a front view.
Figure 6:
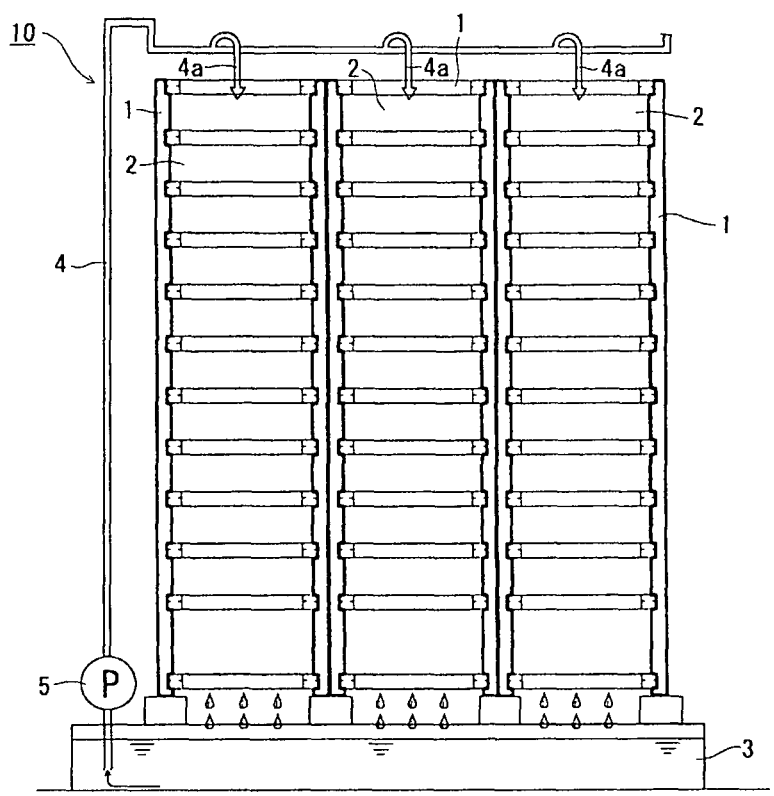
FIG. 6 is a front view schematically illustrating one example of the farming apparatus according to the present invention in the installed state.

Furthermore, because the amount of feed in the cultivation water W decreases as a result of the feeding activity of the cultivated shellfish S, it is necessary to provide microalgae and the like in quantities corresponding to this loss, but if there are sufficient levels of feed and oxygen in the supplied cultivation water W or in the stored water W in the cultivating box 2, it may not be necessary to supply new feed and oxygen. Furthermore, if one wishes to reduce the cultivating time, an independent circulation system can be employed, wherein no new cultivation water W is injected into the cultivating boxes 2 from the exterior at any time. For example, as shown in FIG. 5 and FIG. 6, a plurality of racks 1, which accommodate the cultivating boxes 2, may be erected above an aqueous suspension receiving tray 3, in which a water supply pipe 4 is arranged, with a water pump 5 provided midway. An apparatus of the type that circulates cultivation water in this manner can be used as a biofilter wherein, by making use of the filtering capacity of benthic organisms such as bivalves S, a raw liquid containing suspended matter that has been introduced to the cultivating boxes 2, which are farming tanks, is separated into clean water with low suspended matter, which will serve as recirculation water or aquaculture water, and water with a high concentration of organic pollutants, which will undergo fermentative decomposition and serve as liquid fertilizer.

Furthermore, given the behavior of bivalves S, which feed by extending their siphons in dark environments, it is preferable that the degree of the illumination be adjusted in accordance with the feeding conditions for the bivalves being cultivated, by way of the entire farming apparatus 10, or at least the cultivating boxes 2 being covered with a blackout screen, or being in a culvert or the like, so as to produce a state ranging from indoor daylight at 5000 to 10,000 lux to a blackout state, or by way of adjusting the indoor lighting. In other words, situating this in an environment with no greater than indoor daylight levels and controlling the lighting are important elements in promoting cultivation and limiting the proliferation of algae.

The invention claimed is:

1. An apparatus for farming benthic organisms, comprising a plurality of containers substantially configured as drawers, the containers being vertically stacked in a rack, the containers being configured to receive and hold water, suitable for cultivation of benthic organisms, supplied through a conduit or received by immersion of the apparatus in a body of water suitable for cultivation of benthic organisms so that the containers serve as cultivation beds for benthic organisms, the apparatus, being configured so as to be movable back and forth between locations in which the containers are immersed in said body of water and locations in which the containers are in ambient air, thereby to provide for the option of providing the cultivation water by said immersion.

2. A method of farming benthic organisms using the farming apparatus of claim 1, comprising housing and cultivating the benthic organisms densely packed in the containers.

3. The method of claim 2, wherein the benthic organisms are bivalves.

4. A method of farming benthic organisms using the farming apparatus of claim 1, further comprising causing lighting environment of at least the containers to range from indoor daylight conditions to blackout conditions and adjusting the lighting environment within said range in accordance with the feeding conditions of the benthic organisms being cultivated.

5. The method of claim 4, wherein the benthic organisms are bivalves.

6. The method of claim 1, wherein the benthic organisms are bivalves.

7. A method of combining aqua-culture of benthic organisms with production of liquid fertilizer, comprising cultivating benthic organisms in a contained body of cultivating water, whereby organic matter becomes suspended in the cultivating water, filtering the cultivating water in which organic matter is suspended by ingestion thereof by the benthic organisms being cultivated thereby to concentrate the suspended organic matter in a first fraction of the cultivating water and deconcentrating the suspended organic matter in a second fraction of the cultivating water, recirculating the second fraction into the contained body of cultivating water, and permitting fermentative decomposition of organic matter to occur in the first fraction thereby to produce liquid fertilizer.

8. The method of claim 7, wherein the benthic organisms are bivalves.

* * * * *